Patented Oct. 20, 1925.

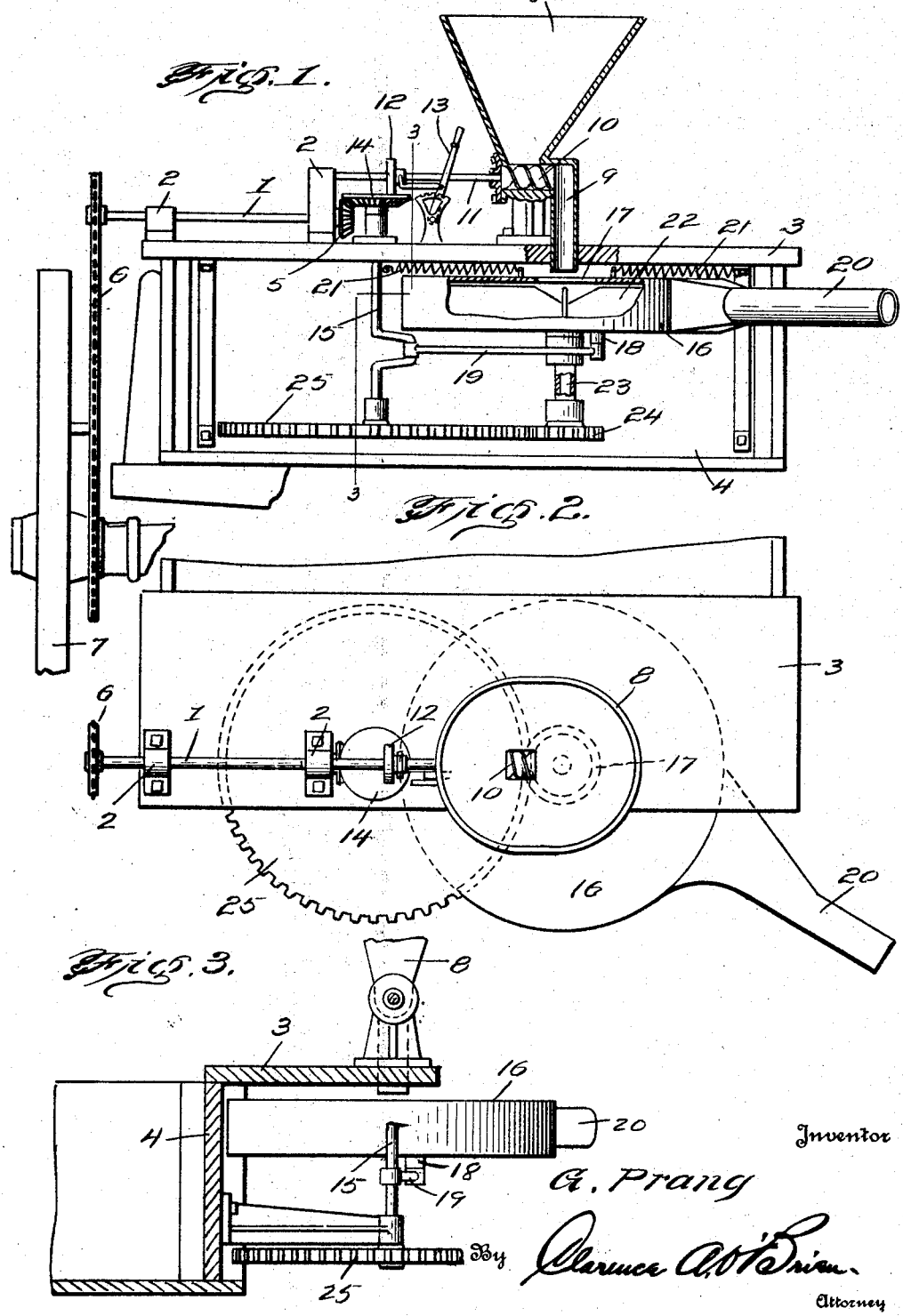

1,558,282

UNITED STATES PATENT OFFICE.

GUSTAV PRANG, OF RICKREALL, OREGON.

SEED SOWING AND DISTRIBUTING MACHINE.

Application filed September 15, 1924. Serial No. 737,875.

*To all whom it may concern:*

Be it known that I, GUSTAV PRANG, a citizen of the United States, residing at Rickreall, in the county of Polk and State of Oregon, have invented certain new and useful Improvements in Seed Sowing and Distributing Machines, of which the following is a specification.

This invention relates to an improved machine for farm use, which is adapted for sowing and distributing seeds over comparatively large areas.

The invention relates more specifically to devices of this class which derive their power from the ground engaging wheels of the vehicle upon which the device is mounted.

Further, the invention has more particular reference to a device of this class which is entirely supported from a removable end gate for a wagon, permitting the entire device to be removed with the end gate.

One feature of the invention is the novel distributor which includes a fan for ejecting the seeds and a casing for the fan which is movably mounted so that it is oscillated during the sowing operation, so that the seeds will be widely scattered.

Another feature of the invention is the driving means which is driven from the aforesaid ground wheel, the driving means being such in the present instance as to simultaneously rotate the fan, oscillate the fan casing and distributor and actuate a seed controlling auger used in association with a hopper.

Other features and advantages of the invention will become apparent during the following description and drawing.

In the drawing:

Figure 1 represents a rear elevation of a portion of the wagon provided with an end gate, upon which the improved seed sowing and distributing device is mounted.

Figure 2 is a top plan view of Figure 1, the ground wheel being omitted.

Figure 3 is an enlarged detail section, taken substantially on the plane of the line 3—3 of Figure 1.

In the drawings, the numeral 1 designates a horizontally disposed driven shaft, which is mounted in suitable bearing brackets 2, on the upper side of a horizontal shelf 3, extending laterally from a removable end gate 4. At its inner end the shaft is provided with a bevelled gear 5, while at its opposite end it is provided with a sprocket wheel, with which the sprocket chain 6 is engaged, the sprocket chain being trained over a sprocket wheel carried by the ground engaging wheel 7. I am aware that this particular method of deriving power from a wagon wheel is not new. Also supported on the upper side of the shelf 3 is a feed receiving hopper 8, provided at its bottom with a vertically disposed discharge pipe 9, extending through an opening in the shelf. The hopper is supported in any suitable way in the bottom thereof and fashioned to accommodate a seed conveying auger 10, mounted on one end of the rotating shaft 11, the outer end of which is journalled in the aforesaid bearing bracket 2. A friction drive wheel 12 is slidably keyed on the shaft 11 and is moved back and forth through the medium of the lever 13. The friction drive 12 is adapted to be engaged with the larger bevelled gear 14, mounted on the upper end of the crank shaft 15. The gear 14 is in mesh with the smaller bevelled gear 5. It is obvious that as the shaft 1 is rotated, the meshing gears will impart rotation to the shaft 11 through the medium of the friction drive wheel 12, thus turning the auger 10 when feeding seed from the hopper into the discharge pipe 9.

The seeds discharging from the pipe 9 enter a fan casing 16, through an intake opening 17 in the top thereof. This casing is mounted for oscillation in any appropriate manner, and is provided with depending pins 18, to which a link 19 is connected, the link being connected at its opposite end to the crank of the shaft 15. It is obvious that with this arrangement, the casing will be oscillated, and inasmuch as it is equipped with the seed discharging spout 20, the seeds ejected therefrom will be distributed over the area 7. To render the oscillation of the fan casing as smooth as possible, I provide suitable tension springs 21, these being anchored at one end to the casing and at their opposite ends to a relatively stationary part. Housed within the casing, is a rotary bladed fan 22, connected with and rotated by the shaft 23, on the lower end of which is a pinion 24. The pinion meshes with the larger gear 25, and since the gear 25 is connected with the crank shaft 15 it will be seen that rotation will be imparted to the fan through the medium of these parts.

With this arrangement it will be seen that the seeds deposited in the casing will be ejected therefrom by the rotating fan.

From the foregoing, it is obvious that the seeds to be distributed are deposited in the hopper 8. As the vehicle travels over the area to be planted, the various shafts 1, 11, 15, and 18 will be set into rotation through the medium of the meshing gears and equivalent parts. Thus, the auger 10 will feed the seed from the hopper into the pipe 9, the same being discharged into the fan casing 16, through the opening 17, whereupon they will be ejected, through the rotation of the fan 22, through the distributor spout 20.

Simultaneously with the ejection of the seeds, the fan casing will be oscillated and the seeds will be uniformly scattered over the ground. The speed of discharge of the seeds from the hopper may be controlled by the adjustable friction drive, already described. Furthermore, since the device is mounted from the end gate, it may be readily removed whenever desired.

It is thought that the foregoing description taken in connection with the accompanying drawings will enable a clear comprehension of the invention to be had. Therefore, a more lengthy description is deemed unnecessary. Although I have shown and described a specific embodiment of the invention, it is to be understood that minor changes coming within the field of invention claimed, may be resorted to, if desired.

I claim:

In a device of the class described, a hopper provided with a seed discharge, a casing into which the seeds are adapted to be discharged, means for mounting said casing to permit oscillation thereof, a distributing spout carried by said casing, a fan for ejecting the seeds, said fan being disposed within said casing, means for controlling the discharge of seed from said hopper, and a single driven shaft for simultaneously operating said seed control means, rotating said fan, and oscillating said casing.

In testimony whereof I affix my signature.

GUSTAV PRANG.